April 12, 1966 R. F. HINTON 3,246,185

PIEZOELECTRIC INSTALLATION

Filed Feb. 28, 1962

INVENTOR.
RAY F. HINTON

BY P. H. Firsht

ATTORNEY.

United States Patent Office 3,246,185
Patented Apr. 12, 1966

3,246,185
PIEZOELECTRIC INSTALLATION

Ray F. Hinton, China Lake, Calif., assignor to the United States of America as represented by the Secretary of the Navy Filed Feb. 28, 1962, Ser. No. 176,884
4 Claims. (Cl. 310—8.3)

The invention herein described may be manufactured and used by or for the Government of the United States of America for governmental purposes without the payment of any royalties thereon or therefor.

The present invention relates to a piezoelectric device for detonating a warhead and more particularly to means for directly coupling the piezoelectric element mechanically to supporting structure without depending upon a hard potting compound.

In one form of piezoelectric fuze device, the piezoelectric element or crystal is mechanically coupled to a rocker arm or operating shaft by potting the element in an opening in the shaft with a potting compound such, for example, as an epoxy resin of sufficient strength and hardness. This method has the disadvantage that exposure to the curing temperature of the potting compound adversely affected the piezoelectric element and its mechanical coupling to the shaft. In another method, a Belleville spring system was placed upon the piezoelectric crystal to provide a path for shock transmission as well as function as a variable spacer for a steel contact button placed between the spring and an external part of the missile. While this method had the advantage of a high voltage output, such voltage output could only be attained when the springs were completely compressed and because of variations due to tolerances the voltage output was not consistent. Another undesirable feature was that parts external to the missile were required; that is, the contact button. In still another method of crystal installation, the piezoelectric element was mounted in a slot cut into a steel slug and potted therein with a conductive epoxy. The steel slug was then placed in a flat bottomed hole machined in the operating shaft, the hole then being potted with a high temperature potting compound the same as the potting compound of the first described method. This method, too, had the same disadvantage that the high curing temperature adversely affected the crystal and provided insufficient mechanical coupling.

The present invention overcomes the deficiencies and disadvantages of prior art systems by providing novel methods of piezoelectric crystal installation which mechanically couple the crystal directly to the supporting shaft structure in a manner to assure a voltage output of sufficient amount and consistency without the necessity for a hard potting compound to effect such coupling. The means providing such direct mechanical coupling comprise in one instance a set screw, in another instance a pair of wedges, and an adjustable wedge in still another instance.

It is therefore an object of the present invention to provide a new and improved method of piezoelectric crystal installation.

Another object is the provision of means mechanically coupling a piezoelectric crystal directly to its supporting structure in a manner which furnishes a voltage output of sufficient amount and reliability.

A further object is to provide a method of piezoelectric crystal installation which mechanically couples the crystal to a supporting structure in a prestressed condition for furnishing a voltage output that has sufficiently high value and only a small deviation from such value.

Still another object is the provision of means for mechanically coupling a piezoelectric crystal directly to its supporting structure, such means being adjustable to couple the crystal to the structure in a desired prestressed condition.

Other objects, features and many of the attendant advantages of this invention will become readily appreciated as the same become better understood by reference to the following detailed referenced description when considered in connection with the accompanying drawings wherein.

Figures 1, 2, 3, 4, 5, 6, 7:
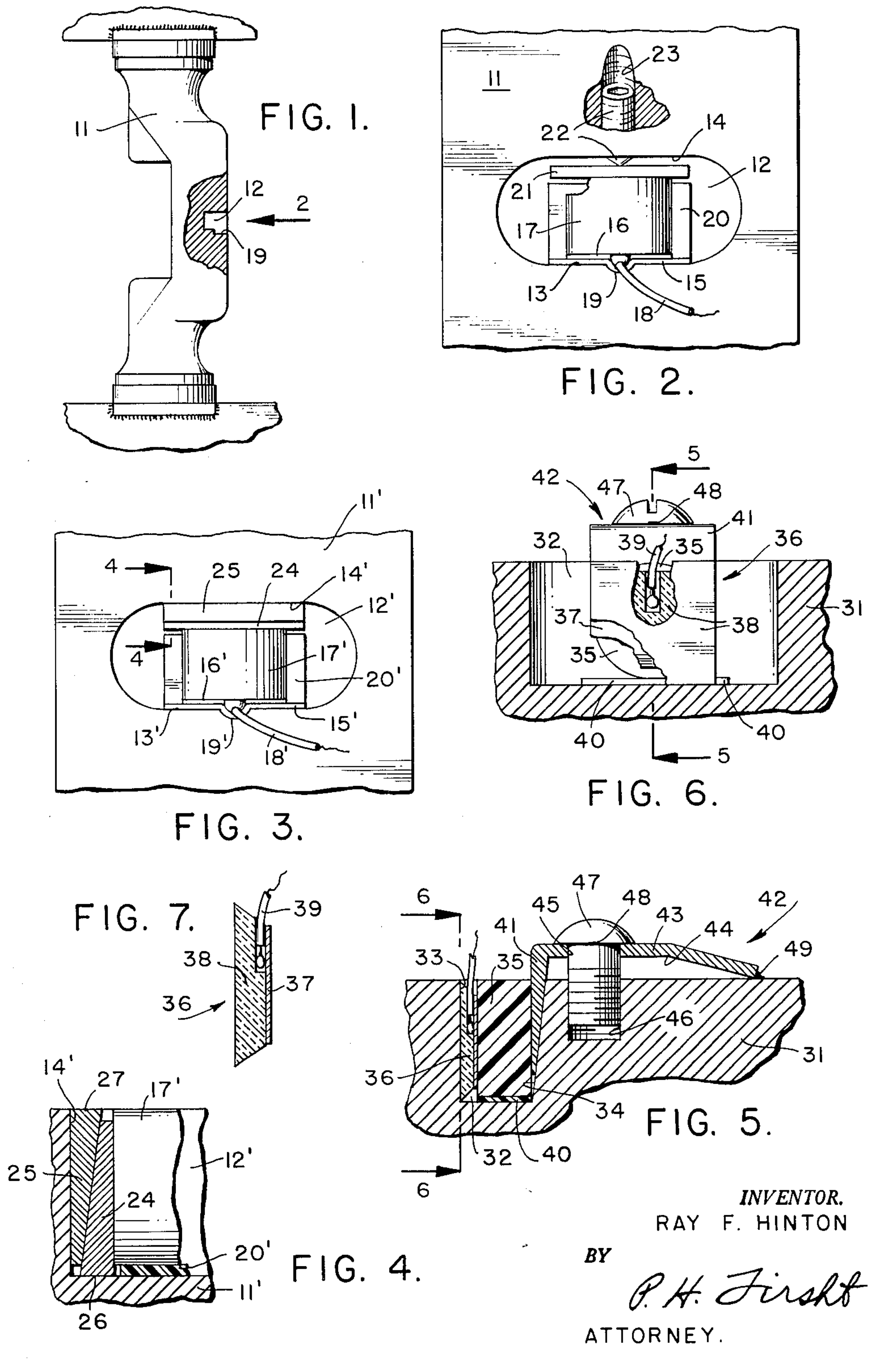
FIG. 1 is a side view, partly in section, of a rocker arm or operating shaft.
FIG. 2 is a fragmentary plan view showing a piezoelectric crystal installed in a supporting shaft structure and employing a set screw for stressing the crystal.
FIG. 3 is a view similar to FIG. 2 but showing a pair of wedges for mechanically coupling the crystal to the supporting shaft structure.
FIG. 4 is a sectional side view along line 4—4 of FIG. 3.
FIG. 5 is a fragmentary sectional side view along line 5—5 of FIG. 6 showing a method of piezoelectric crystal installation employing a wedge element adjustable by turning a screw.
FIG. 6 is an elevational view along line 6—6 of FIG. 5 with parts broken away.
FIG. 7 is an enlarged sectional view of the insulator contact-plate unit used in the embodiment of the invention shown in FIG. 5.

Referring now to the drawings, wherein like reference numerals designate like or corresponding parts throughout the several views, there is shown in FIG. 1 a rocker arm or operating shaft 11 which is similar to the operating shaft (22) shown and described in patent application Serial No. 821,334 filed June 18, 1959, by Robert C. Meade. The rocker arm or shaft 11 is formed with a slot or opening 12 shown in FIG. 2 as having parallel walls 13, 14, the planes of which are perpendicular to the axis of the shaft. Contiguous to wall 13 is an insulating layer of material 15, for example, mica, which insulates a contact plate or coating 16 from the shaft 11. Plate 16 is suitably connected to a piezoelectric element or crystal 17 and has a suitable lead wire 18 extending therefrom, wall 13 being suitably notched or indented, as at 19, to accommodate the lead wire. Crystal 17 is spaced from the bottom of opening 12 by means of a layer 20 of Micarta or the like. On the face of the piezoelectric element 17 opposite from plate 16 is a metal shim or plate 21 which is held in contact therewith by means of a set screw 22 threaded into a threaded bore 23, the axis of the bore being inclined so as to pierce wall 14 at a point substantially centrally of the shim 21 and crystal 17. Adjustment of the set screw 22 serves to mechanically couple the crystal directly to the shaft and to electrically connect the crystal to ground. The voltage is adjusted to desired output by turning the set screw 22 while standard hammer testing, the voltage output of the crystal being suitably connected so as to be observed on a memoscope. The opening 12 is then filled with a potting compound or other suitable material to seal the crystal installation and lock the adjustment.

FIG. 3 shows an installation somewhat similar to that of FIG. 2, reference numerals 11′, 12′, 13′, 14′, 15′, 16′, 17′, 18′, 19′ and 20′ designating elements or components similar to elements 11 through 20 of FIG. 2. This installation, in FIG. 4, shows a pair of matched wedges 24 and 25 for prestressing the crystal 17′. Wedge 24 is disposed within opening 12′ next to the face of crystal 17′ opposite contact plate 16′, with the thick edge 26 of the wedge at the bottom of the opening. The wedge 25 is disposed with one face thereof in contact with wall 14′ with the thick edge 27 thereof opposite to the thick edge 26 of wedge 24 whereby the facing surfaces of the wedges are inclined with the respect to the axis of the shaft 11′ and downward movement of wedge 25 into opening 12′ serves to push crystal 17′ further from wall 14′ and thereby stress the same. The adjustment of the voltage output is accomplished by tapping the wedge 25 while standard hammering until the memoscope shows the desired voltage output. The installation is then potted to seal and lock the same.

Turning now to FIG. 5 there is shown a portion of a rocker arm or operating shaft 31 in which is formed an opening 32 having a flat wall 33 and an oppositely facing wall 34 inclined with respect to the plane of wall 33. In the opening 32 there is a piezoelectric element or crystal 35 and between the crystal 35 and wall 33 there is disposed an insulator-contact plate unit 36 which comprises a metal contact plate 37 in contact with the crystal and a layer of insulating material 38 engaging wall 33; FIGS. 6 and 7. Suitably connected to the contact plate 37 is a lead wire 39, the layer of insulating material being suitably cut away to accommodate such connection whereby it is unnecessary to indent or notch wall 33 to accommodate the lead wire. A layer 40 of Micarta or the like supports crystal 35 and spaces it from the bottom of opening 32. Disposed in the wedge shaped opening defined by crystal 35 and inclined or sloping wall 34 is a leg 41 of a substantially right angled wedge member 42, the other leg 43 of the member being slightly bent as at 44 and having a perforation 45 therethrough. Leg 41 is tapered or wedge shaped and has flat faces in contact with crystal 35 and sloping wall 34. Passing through aperture 45 and threaded into a threaded bore 46 in shaft 31 is an adjustment screw 47, threading of the screw sufficiently into shaft 31 serving to force the tapered leg 41 downwardly and exert pressure on crystal 35 so as to prestress the same to a desired voltage output while standard hammer testing. When the desired adjustment of pressure on the crystal has been obtained, the head of the screw 47 is spot welded to the wedge member 42, as at 48, and the end of the leg 43 is spot welded to the shaft 31, as at 49, the spot welds serving to lock the adjustment. The crystal and leg 41 are then sealed with a potting compound. The adjustment of the pressure on the crystal of this installation to obtain the desired voltage output may be accomplished by the application of a predetermined amount of torque to the adjustment screw 47.

Various tests showed that adjustability for the desired voltage output was easier with the set screw method than with the wedge method but that potting had considerable effect on the set screw installation and only slight effect on the installation using the pair of matched wedges. It therefore appears that the hardness of the potting compound effects the voltage output. Also, the method of presetting the voltage output as by tapping the wedges is awkward and does not lend itself to installation of the piezoelectric devices en masse.

Since in the modified wedge system of FIG. 5 the adjustment is easily made and locked in by fixing the relative position of the elements by spot welds, the rigid potting compound is no longer necessary and a silicone rubber compound modified with silicone fluids may be used for a nonrigid hermetic seal. Tests indicate that this method of potting has no effect on the preset voltage. Also, the use of a thicker insulator not only provides greater insulation but also eliminates the need for a notch or indentation in the vertical wall for lead wire relief and reduces lead wire breakage from the crystal.

There have thus been provided methods of piezoelectric crystal installation in which the crystal is directly mechanically coupled in ways which furnish a substantially stable voltage of sufficiently high value without dependence upon a potting compound for mechanical coupling. Obviously many modifications and variations of the present invention are possible in the light of the above teachings. It is therefore to be understood that within the scope of the appended claims the invention may be practiced otherwise than as specifically described.

What is claimed is:

1. Means for prestressing a piezoelectric element to provide a desired voltage output comprising, in combination, a supporting structure formed with an opening having a pair of opposite walls, one of said walls being vertical and the other being inclined, a piezoelectric element adjacent said vertical wall, tapered means disposed between said element and said inclined wall, and means supported by said structure for moving said tapered means relative to said inclined wall for forcing said element toward said vertical wall.

2. The combination of claim 1, in which said means for moving said tapered means comprises an adjustment screw.

3. A piezoelectric installation comprising, in combination, a structure with an opening therein formed with walls facing each other, a piezoelectric element in said opening adjacent one of said walls, and adjustable means for forcing said element toward said one wall, said means including a member having legs at an angle to each other, one of said legs being disposed between said element and another of said walls, another of said legs being connected by adjusting means to said structure.

4. The combination of claim 3, in which said legs are generally at right angles, and said adjusting means comprises a threaded element.

References Cited by the Examiner

UNITED STATES PATENTS

| | | | |
|---|---|---|---|
| 1,619,125 | 3/1927 | Hough | 340—10 X |
| 1,829,234 | 10/1931 | Nicolson | 310—9.1 X |
| 2,824,980 | 2/1958 | Oshry | 310—8.3 |
| 3,075,099 | 1/1963 | Shoor | 310—8.4 |
| 3,101,420 | 8/1963 | Hufferd et al. | 310—8.7 |

ORIS L. RADER, *Primary Examiner.*

KATHLEEN H. CLAFFY, *Examiner.*

R. A. FARLEY, A. J. ROSSI, *Assistant Examiners.*